United States Patent [19]
Whitted, III et al.

[11] Patent Number: 5,867,722
[45] Date of Patent: Feb. 2, 1999

[54] STICKY BIT DETECTOR FOR A FLOATING-POINT PROCESSOR

[75] Inventors: Graham B. Whitted, III, Irvine; Hsiao Shih Chang, Orange, both of Calif.

[73] Assignees: United Microelectronics Corporation, Hsin Chu, Taiwan; Meridian Semiconductor, Inc., Irvine, Calif.

[21] Appl. No.: 15,484

[22] Filed: Jan. 28, 1998

Related U.S. Application Data

[63] Continuation of Ser. No. 423,792, Apr. 25, 1995, abandoned.

[51] Int. Cl.$^6$ .................................................. G06F 13/00
[52] U.S. Cl. .................................. 395/800.1; 395/800.32; 364/715.03; 364/748.05; 364/748.16; 364/754.01; 364/754.11
[58] Field of Search ........................... 395/800.1, 800.32; 364/748.16, 748.03, 754.11, 715.03, 748.05, 754.01

[56] References Cited

U.S. PATENT DOCUMENTS

| Re. 33,629 | 7/1991 | Palmer et al. | 364/748.16 |
|---|---|---|---|
| 4,338,675 | 7/1982 | Palmer et al. | 364/748.16 |
| 4,367,524 | 1/1983 | Budde et al. | 395/596 |
| 4,484,259 | 11/1984 | Palmer et al. | 364/754.01 |
| 4,777,613 | 2/1988 | Shahan et al. | 364/748.16 |
| 4,928,259 | 5/1990 | Galbi et al. | 364/754.11 |
| 5,010,508 | 4/1991 | Sit et al. | 364/754.11 |
| 5,027,308 | 6/1991 | Sit et al. | 364/760.05 |
| 5,036,482 | 7/1991 | Saini | 378/98.3 |
| 5,157,777 | 10/1992 | Lai et al. | 364/748.09 |
| 5,195,051 | 3/1993 | Palaniswami | 364/740.07 |
| 5,204,828 | 4/1993 | Kohn | 364/715.03 |
| 5,235,533 | 8/1993 | Sweedler | 364/715.03 |
| 5,257,215 | 10/1993 | Poon | 364/748.03 |
| 5,258,943 | 11/1993 | Gamez et al. | 364/748.03 |
| 5,260,889 | 11/1993 | Palaniswami | 364/748.05 |

OTHER PUBLICATIONS

*Double–Precision Floating Point Processor*–Users Manual 1988/9, Advanced Micro Devices, Inc., Chapter 3 (pp. 3–1 to 3–32), Sunnyvale California, Copyright 1988.
Neil H.E. Weste, et al., *Principals of CMOS VLSI Design, A Systems Perspective*, Addison–Wesley Publishing Company, 1985, pp310–338.
Mckinney et al., A Multiple–access Pipeline Architecture of Digital Signal Processing:, IEEE, pp 283–290, Mar. 1988.
Lange, et al., "An Optima Floating–Point Pipeline CMOS CORDIC Processor"IEEE, pp 2043–2047, 1988.
Snyder, et al., "100 MegaFlop Double Precision IEEE Multiplier Block for Advanced Bipolar VLSI", IEEE, pp. 17.4.1–17.4.3, 1988.

*Primary Examiner*—Alyssa H. Rowler
*Assistant Examiner*—Dzung C. Nguyen
*Attorney, Agent, or Firm*—Knobbe, Martens, Olson & Bear LLP

[57] ABSTRACT

A floating-point processor and method detect a sticky bit during a floating point operation. The floating-point processor includes a sticky bit predictor circuit, a bit scanner, an exponent arithmetic circuit, and a mantissa arithmetic logic circuit. Input and output circuitry allow the floating-point processor to communicate with another processor. The bit scanner generates sticky significance values corresponding to the operands. When adding two operands, the sticky bit predictor circuit compares the sticky significance value of the smaller operand with an alignment value in order determine whether to set the sticky bit.

21 Claims, 7 Drawing Sheets

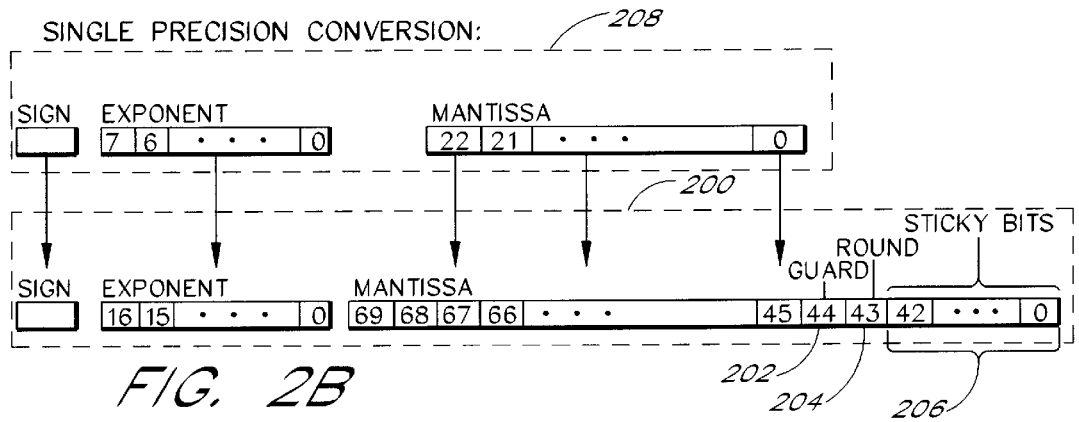
FIG. 2A
FIG. 2B
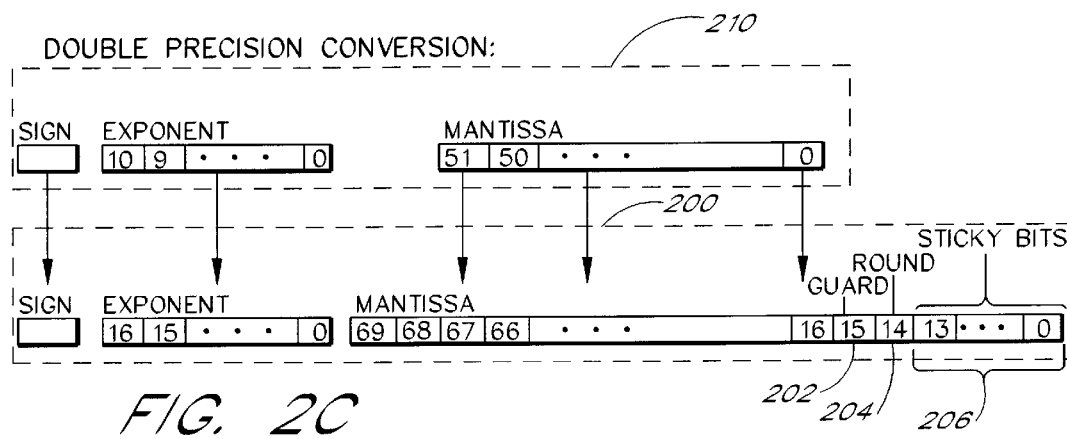
FIG. 2C
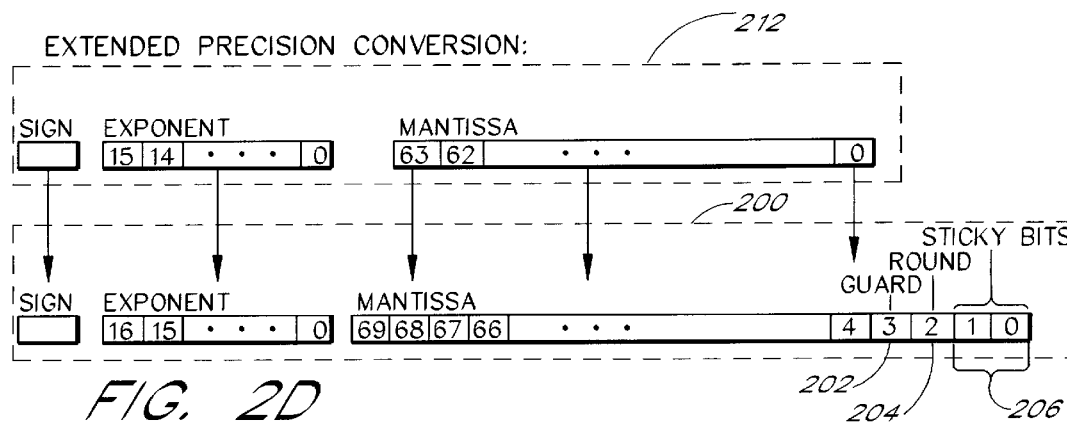
FIG. 2D

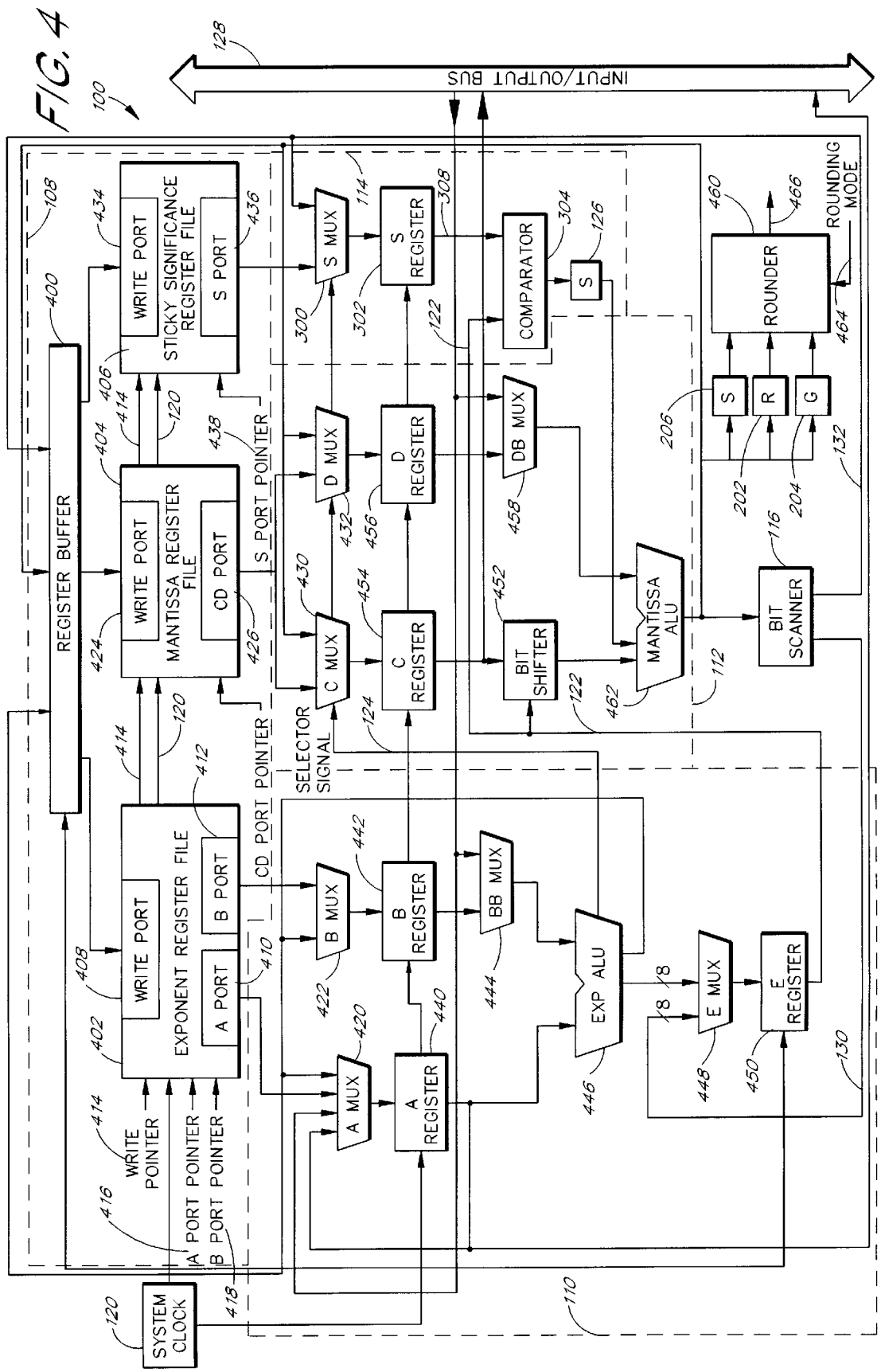

| | 1ST CYCLE | 2ND CYCLE | 3RD CYCLE | 4TH CYCLE | 5TH CYCLE | 6TH CYCLE |
|---|---|---|---|---|---|---|
| LOAD R1 *600* | A) COMPUTE R1 NORMALIZATION VALUE<br>B) LOAD C REGISTER | A) NORMALIZE R1 EXPONENT<br>B) NORMALIZE R1 MANTISSA<br>C) COMPUTE R1 STICKY SIGNIFICANCE VALUE<br>D) LOAD REGISTER BUFFER | A) LOAD R1 EXPONENT REGISTER FILE<br>B) LOAD R1 MANTISSA REGISTER FILE<br>C) LOAD R1 STICKY SIGNIFICANCE REGISTER FILE | | | |
| LOAD R2 *602* | | | A) COMPUTE R2 NORMALIZATION VALUE<br>B) LOAD C REGISTER | A) NORMALIZE R2 EXPONENT<br>B) NORMALIZE R2 MANTISSA<br>C) COMPUTE R2 STICKY SIGNIFICANCE VALUE<br>D) LOAD REGISTER BUFFER | A) LOAD R1 EXPONENT REGISTER FILE<br>B) LOAD R1 MANTISSA REGISTER FILE<br>C) LOAD R1 STICKY SIGNIFICANCE REGISTER FILE | |
| ADD R1, R2 *604* | | | | A) LOAD R1 EXPONENT<br>B) LOAD R2 EXPONENT<br>C) DIRECT R1 MANTISSA & R2 MANTISSA TO THE CMUX & DMUX<br>D) DIRECT R1 STICKY VALUE & R2 STICKY VALUE TO SMUX | A) ALIGN EXPONENTS<br>B) LOAD C REGISTER<br>C) LOAD D REGISTER<br>D) LOAD S REGISTER | A) ADD EXPONENTS<br>B) ALIGN & ADD MANTISSAS<br>C) ROUND W/GUARD ROUND & STICKY BITS |

FIG. 6

STICKY BIT DETECTOR FOR A FLOATING-POINT PROCESSOR

This application is a continuation of U.S. patent application Ser. No. 08/423,792, filed on Apr. 25, 1995 now abandoned.

FIELD OF THE INVENTION

The present invention relates to the field of semiconductor microprocessors. In particular, this invention relates to the computation of a sticky bit in the floating-point processor of a microprocessor.

BACKGROUND OF THE INVENTION

Engineering and scientific calculations require a high degree of precision and a wide dynamic range. The high precision minimizes the overall error associated with a computation. The wide dynamic range, on the other hand, ensures that calculations involving very large or very small numbers produce a valid result.

While the twin demands of precision and dynamic range can be represented with very long integers, this approach reduces computational speed and increases costs. Therefore, in order to reduce costs and increase speed, many conventional computers use floating-point notation. Floating-point notation is a numeric format which can represent large and small numbers with fewer bits than are required by very long integers. The computational circuitry that performs floating-point operations is often called a floating-point processor.

The basic principles of floating-point arithmetic are familiar to anyone who has used a scientific calculator. Basically, floating-point numbers are stored in two parts, a mantissa and an exponent. The mantissa specifies the digits in the number, and the exponent specifies the magnitude of the number (the position of the decimal point). For example, the numbers 234,500,000 and 0.0000678 are expressed respectively as $2.345 \times 10^8$ and $6.78 \times 10^{-5}$ in floating-point notation.

Most standard methods of representing floating-point numbers specify that numbers should be represented in normalized form whenever possible. A normalized floating point number is one in which the left-most digit (or bit, in a binary representation) of the mantissa is non-zero. A typical floating-point processor normalizes a number by left-shifting the most significant non-zero bit into the first bit of the mantissa. For each left-shift, the floating point processor increments the exponent by one.

Before the floating-point processor can add two operands, the floating-point processor "aligns" the two operands. The alignment process sets the exponents of the operands numbers to the same value. During the alignment process, the floating-point processor compares the exponents of the two operands, and increases the value of the smaller exponent to equal the value of the larger exponent. When the floating-point processor increments the smaller exponent, the floating-point processor also right-shifts the mantissa of the smaller operand.

One problem that may arise during this alignment process is that significant data can be right-shifted out of the smaller operand, causing a loss of precision as is illustrated in the following case:

$$1.23000 \times 10^8 +$$
$$4.56789 \times 10^5$$

Before adding the two numbers, the floating-point processor right-shifts the mantissa of the second number three places:

$$\begin{array}{r} 1.23000 \times 10^8 \\ + 0.00456 \times 10^8 \\ \hline = 1.23456 \times 10^8 \end{array}$$

Clearly in this case the three least significant digits of the smaller operand "789" are lost, and the overall precision of the operand is degraded.

Thus, floating-point addition requires the alignment of one of the two input operands before the actual add can take place. As shown in the example above, significant (non-zero) digits may be "shifted out" and lost during the alignment process because of the finite width of the computational elements. The process of rounding can reduce this problem to insignificant proportions by capturing the bits which are "lost" or shifted out during the arithmetic operations.

There are a number of different rounding schemes in existence. Each specifies a different set of rules for deciding how to derive the final (rounded) result. Although various floating-point standards are available, a floating-point standard which is widely accepted is the IEEE (Institute of Electrical and Electronic Engineers, Inc.) Binary Floating Point Standard 754, which is herein incorporated by reference.

The IEEE 754 standard specifies different rounding modes in which each mode defines a different set of rules for deciding how to derive the final (rounded) result. These rounding modes include: round-to-nearest, round-to-minus-infinity, round-to-plus-infinity, and round-to-zero. In addition, many major manufacturers have defined particular rounding schemes, such as Digital Equipment Corporation's DEC-round-to-nearest and the IBM round-to-zero mode.

In order to implement the various rounding modes correctly, conventional floating-point processors retain some of the bits shifted out of the mantissa. It is commonly known that in order to make a correct decision in all cases, it is necessary and sufficient to retain three additional bits to the right of the mantissa. These bits are known as the "guard," "round" and "sticky" bits.

The guard bit and round bit act as straightforward extensions of the operand mantissa, to the right of the mantissa's least-significant bit. The floating-point processor right-shifts data from the mantissa into the guard bit and the round bit. Subsequently, the floating-point processor may left-shift the data from the guard and round bits back into the mantissa during the normalization process.

Conventional floating-point processors selectively set the sticky bit once the floating-point processor shifts data past the round bit. Floating-point processors do not left-shift data out of the sticky bit, even if the sticky bit is set. Rather, the sticky bit acts as a memory, indicating, when set, that the floating-point processor has right-shifted significant data out of the mantissa beyond the round bit. In other words, the sticky bit is defined as the OR of all of the bits which are less significant than the round bit.

By considering the values of the guard, round and sticky bits at the time rounding is to be performed, conventional floating-point processors determine which of the closest representable numbers should be output as a result of the operation. One disadvantage of the prior art systems is that the sticky bit is calculated during the addition process. As a result, the time required to calculate the sticky bit can delay completion of the addition process. If, however, the time to calculate the sticky bit can be reduced, the time to complete an addition can also be reduced, thereby increasing the overall speed and performance of the floating-point processor.

Recently, the clock speeds of conventional floating-point processors have become increasingly faster so that any delays in the addition process can result in delays in the overall system performance. In order to optimize the time required to multiply two numbers, some floating-point processors separately scan a number during the multiplication process in order to predict the need to generate a sticky bit. Such systems, however, fail to scan a mantissa prior to an addition operation. Thus, instead of relying on a prescanned sticky significance value, prior art systems scan a mantissa during the addition process and therefore require the additional time associated with such scanning.

In addition, advances in parallel processing have resulted in improved floating-point performance. Parallel processing, however, requires the distribution of the workload among parallel processes. If the workload is unequally distributed, the slowest process delays the entire system.

Conventional floating-point processors do not determine a sticky significance value in parallel with other operations. For example, conventional floating-point processors normalize and align numbers prior to performing an addition. If the floating-point processor can determine the sticky significance value in parallel with the normalization or alignment processes the resultant floating-point additions can execute faster and make greater use of parallel architectures.

Therefore, it would be advantageous to develop a scheme in which the sticky bit can be calculated by scanning a mantissa prior to the addition process. Such a scheme would reduce the time needed to add two numbers. Furthermore, it would be advantageous to calculate the sticky bit in parallel with other floating-point operations so as to increase system throughput and optimize work distribution.

SUMMARY OF THE INVENTION

The problems outlined above are in large part solved by the method and apparatus of the present invention. That is, the sticky bit detector of the present invention reduces the computational time required to perform a floating point addition. Prior to an addition operation, the sticky bit detector scans the mantissa of a floating-point number to determine a sticky significance value. During the addition operation, the floating-point processor uses the sticky significance value to determine the value of the sticky bit and thereby eliminates the need to scan the mantissa during the addition operation. The present invention also determines the sticky significance value in parallel with other floating-point operations.

Eliminating the need to scan a mantissa during an addition operation improves computational speed. Faster computational speed allows faster clock speeds and improves floating point performance. Accordingly, faster floating-point processors can be fabricated without the need for more expensive materials.

Furthermore, the floating-point processor of the present invention offers flexibility for future computer designs and configurations. Because the present invention determines a sticky significance value prior to an addition operation, the present invention can determine the sticky significance value in parallel with other processes. Thus the present invention is adaptable to a variety of parallel processing architectures.

Broadly speaking, the present invention contemplates a sticky bit detector which uses hardware to scan the trailing zeros of a mantissa in order to determine the location of the least significant non-zero bit. The location of the least significant non-zero bit is referred to as the sticky significance value. In other words, the sticky significance value is the number of times a floating-point processor can right-shift a mantissa before it shifts a non-zero bit into the sticky bit.

For example, prior to adding two operands, the floating-point processor "aligns" the two operands. This alignment requires the floating-point processor to adjust the operands so that their two exponents are equal. The floating-point processor performs the alignment by right-shifting the mantissa of the smaller operand. The number of right-shifts is specified by an alignment value. The present invention determines the alignment value by subtracting the exponents of the two operands. The alignment value is, therefore, the number of bits by which the floating-point processor right-shifts the mantissa of the smaller operand.

By comparing the sticky significance value (the number of times a floating-point processor can right-shift a mantissa before it shifts a non-zero bit into the sticky bit) with the alignment value (the number of right-shifts to align the mantissa), the floating point processor can predict the sticky bit value. In other words, if the alignment value is greater than or equal to the sticky significance value, the sticky bit predictor circuit sets the sticky bit.

The present invention uses a sticky bit predictor circuit to determine the value of the sticky bit during an addition operation. The sticky bit predictor circuit compares the sticky significance value with the alignment value to determine whether the sticky bit needs to be set during the alignment process. The comparison of the sticky significance value with the alignment value allows the sticky bit predictor circuit to determine the value of the sticky bit in parallel with the addition process.

A further feature of the present invention, allows the parallel computation of the sticky significance value with other floating-point processes. In particular, the present invention uses an exponent arithmetic circuit, a mantissa arithmetic circuit, a bit scanner, and the sticky bit prediction circuit to simultaneously execute multiple operations in parallel. For example, the present invention can simultaneously align two mantissas, add two exponents and predict the sticky bit during an addition. Furthermore, while computing the sticky significance value for a first operand, the present invention can begin computing the sticky significance value for a second operand.

In accordance with the method of the invention, the floating-point processor generates a plurality of sticky significance values that correspond to a plurality of operands. During the addition of two operands, the floating-point processor generates an alignment value that specifies the number of right-shifts needed to align a mantissa of the smaller operand. The floating-point unit compares the alignment value with the sticky significance value and generates the sticky bit in parallel with the addition operation.

These and other aspects, advantages, and novel features of the invention will become apparent upon reading the following detailed description and upon reference to accompanying drawings in which:

BRIEF DESCRIPTION OF THE DRAWINGS

FIGS. 2A–2D are pictorial representations which illustrate the internal format of an internal operand (FIG. 2A), the conversion of a single precision operand to an internal operand (FIG. 2B), the conversion of a double precision operand to an internal operand (FIG. 2C), and the conversion of an extended precision operand to an internal operand (FIG. 2D).

FIG. 4 is a detailed block diagram of the floating-point processor showing the memory, the system clock, the exponent arithmetic circuit, the mantissa arithmetic circuit, the sticky bit predictor circuit and the bit scanner.

FIG. 6 is a cycle decode table showing the parallel execution of operations in the floating-point processor.

DETAILED DESCRIPTIONS OF THE PREFERRED EMBODIMENT

Figure 1:
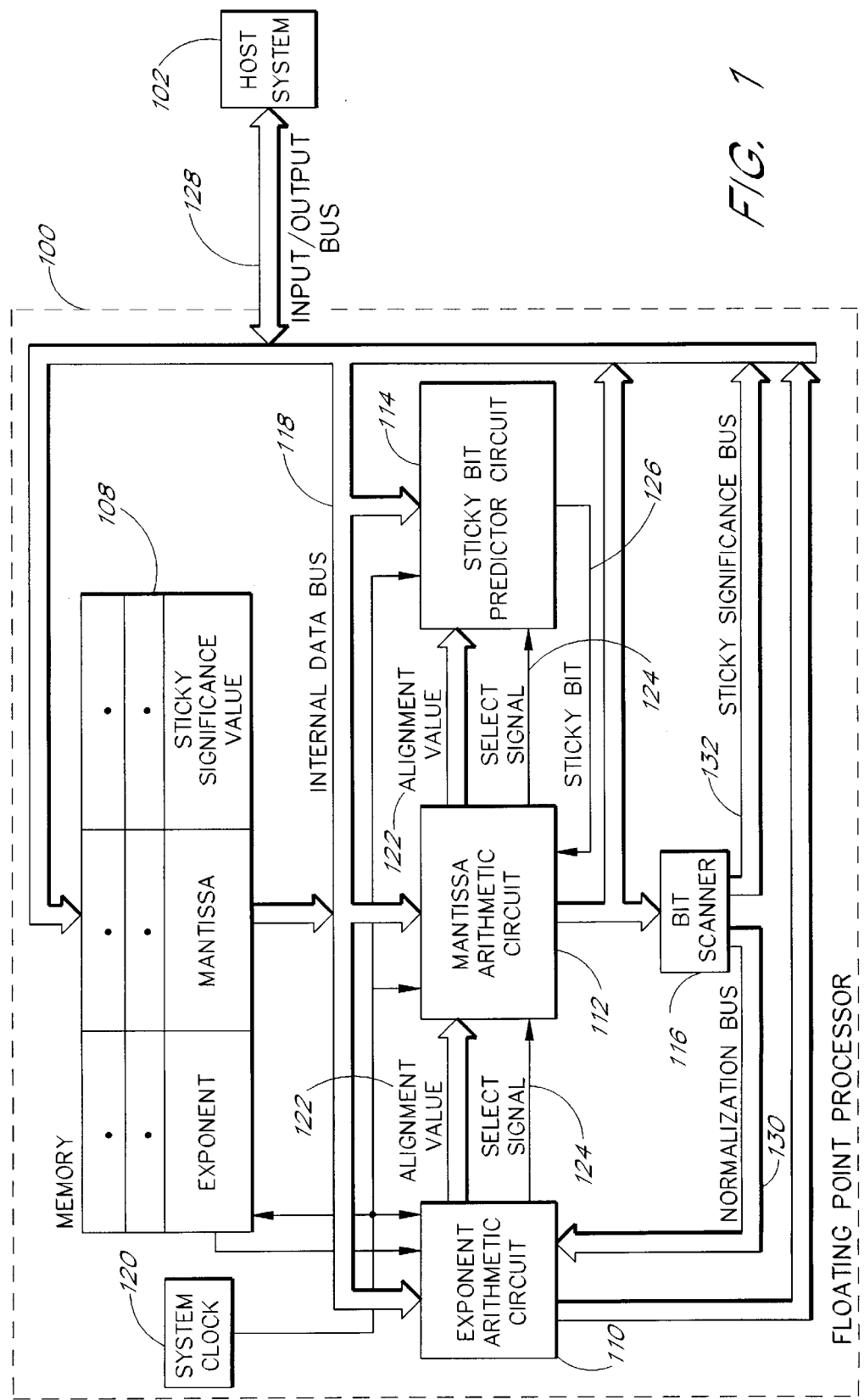
FIG. 1 is a block diagram of a floating-point system with a host computer, an input/output bus and a floating point processor wherein the floating point processor further includes a floating-point data bus, a memory, a system clock an exponent arithmetic circuit, a mantissa arithmetic circuit, a sticky bit predictor circuit and a bit scanner.

Reference will now be made to the drawings wherein like numerals refer to like parts. FIG. 1 is a block diagram which shows the major functional elements used in accordance with a floating-point processor 100 of the present invention. The floating-point processor 100 comprises a memory unit 108, an exponent arithmetic circuit 110, a mantissa arithmetic circuit 112, a sticky bit predictor circuit 114 and a bit scanner 116. These elements are interconnected by means of an internal data bus 118 and controlled by a system clock 120.

Furthermore, the exponent arithmetic circuit 110 generates an alignment value on a line 122 and a select signal on a line 124 that are in communication with the mantissa arithmetic circuit 112 and the sticky bit predictor circuit 114. The sticky bit predictor circuit 114 also communicates with the mantissa arithmetic circuit 112 via a sticky bit signal line 126. (Note, the signal line number will be used herein to represent both the signal lines and the signals on the respective lines. For example, the select signal 124 is communicated by the select signal line 124.)

In addition to the floating-point processor 100, the block diagram also illustrates a host system 102. The host system may, for example, comprise a general purpose floating-point processor, a numeric co-processor, a microprocessor, or the like. The host system 102 communicates with the floating-point processor 100 via the input/output bus 128. The input/output bus 128 is capable of transmitting single, double and extended precision floating-point operands.

1. Input Conversion

The host system 102 writes operands into the floating point processor 100 via the input/output bus 128. As will be explained in more detail below, the memory unit 108 stores floating-point operands in standard formats that include single precision, double precision and extended precision formats. Furthermore, the memory unit 108 stores operands in an internal format that differs from standard single precision, double precision and extended precision formats. As illustrated in FIG. 2A, an internal operand 200 of the preferred embodiment, has a sign bit, a 17-bit exponent and a 70-bit mantissa. The most significant bit (bit 69) of the mantissa is an overflow bit while bit 68 is always set to one and will become the most significant bit after the alignment procedure discussed below.

When the host system writes a floating point operand into the memory unit 108, the floating-point operands are stored in their standard format. As illustrated in FIGS. 2B–2D, however, when the floating point processor 100 uses a single precision operand 208, a double precision operand 210 and an extended precision operand 212, the floating point processor converts Them an internal operand 200.

The single precision, double precision and extended precision operands supplied by the host system 102 adhere to commonly accepted standards. Therefore, in the preferred embodiment, a single precision floating-point operand 208 has a sign bit, an 8-bit exponent and a 23-bit mantissa as illustrated in FIG. 2B. A double precision floating-point operand 210 has a sign bit, a 11-bit exponent and a 52-bit mantissa as illustrated in FIG. 2C. An extended precision floating-point operand 212 has a sign bit, a 16-bit exponent and a 64-bit mantissa as illustrated in FIG. 2D.

In the preferred embodiment, the floating-point processor 100 converts each standard format operand into the internal operand 200. With respect to FIG. 2B, the floating-point processor 100 converts the 8 bits of the single precision exponent into the least significant bits of the 17-bit internal exponent and loads the 23-bit single precision mantissa into bits 67 through 45 of the internal mantissa. The remaining bits in the mantissa represent the guard bit 202 (bit 44) the round bit 204 (bit 43) and the sticky bit 206. In the preferred embodiment, bits 42 through 0 contain a plurality of sticky bits 206.

With respect to FIG. 2C, the floating-point processor 100 converts a double precision operand 210 into an internal operand 200 by transferring the 11-bit double precision exponent into the least significant bits of the 17-bit internal exponent and by transferring the 52-bit extended mantissa into bits 67 through 16 of the internal mantissa. The remaining bits in the mantissa represent the guard bit 202 (bit 15) the round bit 204 (bit 14) and a plurality of sticky bits 206. In the preferred embodiment, bits 13 through 0 contain the plurality of sticky bits 206.

With respect to FIG. 2D, the floating-point processor 100 converts an extended precision operand 212 into an internal operand 200 by transferring the 16-bit double precision exponent into the least significant bits of the 17-bit internal exponent and by transferring the 64-bit extended mantissa into bits 67 through 4 of the internal mantissa. The remaining bits in the mantissa represent the guard bit 202 (bit 3) the round bit 204 (bit 2) and the plurality of sticky bits 206. In the preferred embodiment, bits 1 and 0 contain two sticky bits.

2. The Bit Scanner

After the floating point processor 100 converts the single precision operand 208, the double precision operand 210 or the extended precision operand 212 into the internal operand 200, the floating-point processor 100 directs the mantissa of the internal operand 200 through the mantissa arithmetic circuit 112 to the bit scanner 116. Referring to FIG. 1, the bit scanner 116 of the present invention has a dual function. First, the bit scanner 116 scans the mantissa to determine the normalization value. The bit scanner 116 of the preferred embodiment outputs the normalization value on the normalization bus 130. Second, the bit scanner 116 scans the mantissa to determine the sticky significance value output on the sticky significance bus 132.

The bit scanner 116 determines the normalization value by locating the most significant non-zero bit in the mantissa. In particular, the bit scanner 116 comprises a leading zero encoder to determine the location of the first non-zero bit in the mantissa. The location of the first non-zero bit (the normalization value) identifies the number of bits that the floating-point processor 100 left-shifts the mantissa during the normalization process. The normalization value of the preferred embodiment is 8 bits wide and is provided on the normalization bus 130.

For example, if the internal operand 200 has a mantissa with leading zeros such as the number 0000111 . . . 1111 (the mantissa of the preferred embodiment comprises 70 bits as illustrated in FIG. 2A), the bit scanner 116 determines that three leading zeros exist (the most significant bit is only used as an overflow bit). The floating-point processor 100 can then normalize the number by left-shifting the mantissa three times and decrementing the exponent by three to produce a mantissa with the number 011 . . . 1111000.

In addition, to calculating the normalization value, the bit scanner 116 also determines the sticky significance value. The sticky significance value is the location of the least significant non-zero in the mantissa. In other words, the sticky significance value is the number of times a mantissa can be right-shifted before it shifts a non-zero bit into the sticky bit. The bit scanner 116 determines the sticky significance value by scanning the trailing zeros of the mantissa with a trailing-zero encoder. In the preferred embodiment the sticky significance value is 8 bits wide and the bit scanner 116 outputs the sticky significance value onto the sticky significance bus 132.

For example, if the internal operand 200 has a mantissa with trailing zeros such as the number 0111 . . . 1111000000 (in the preferred embodiment as illustrated in FIG. 2A, the mantissa comprises 70 bits with the least significant bits representing the guard bit 202, the round bit 204, and the sticky bits 126), the bit scanner 116 determines that six trailing zeros exist. As a result, the bit scanner 116 generates a sticky significance value that indicates 6 trailing zeros exist. Therefore, as explained in more detail below, if the floating point processor 100 right-shifts the mantissa 7 or more bits, the sticky bit predictor circuit 114 sets the sticky bit 126.

3. The Sticky Bit Predictor Circuit

Figure 3:
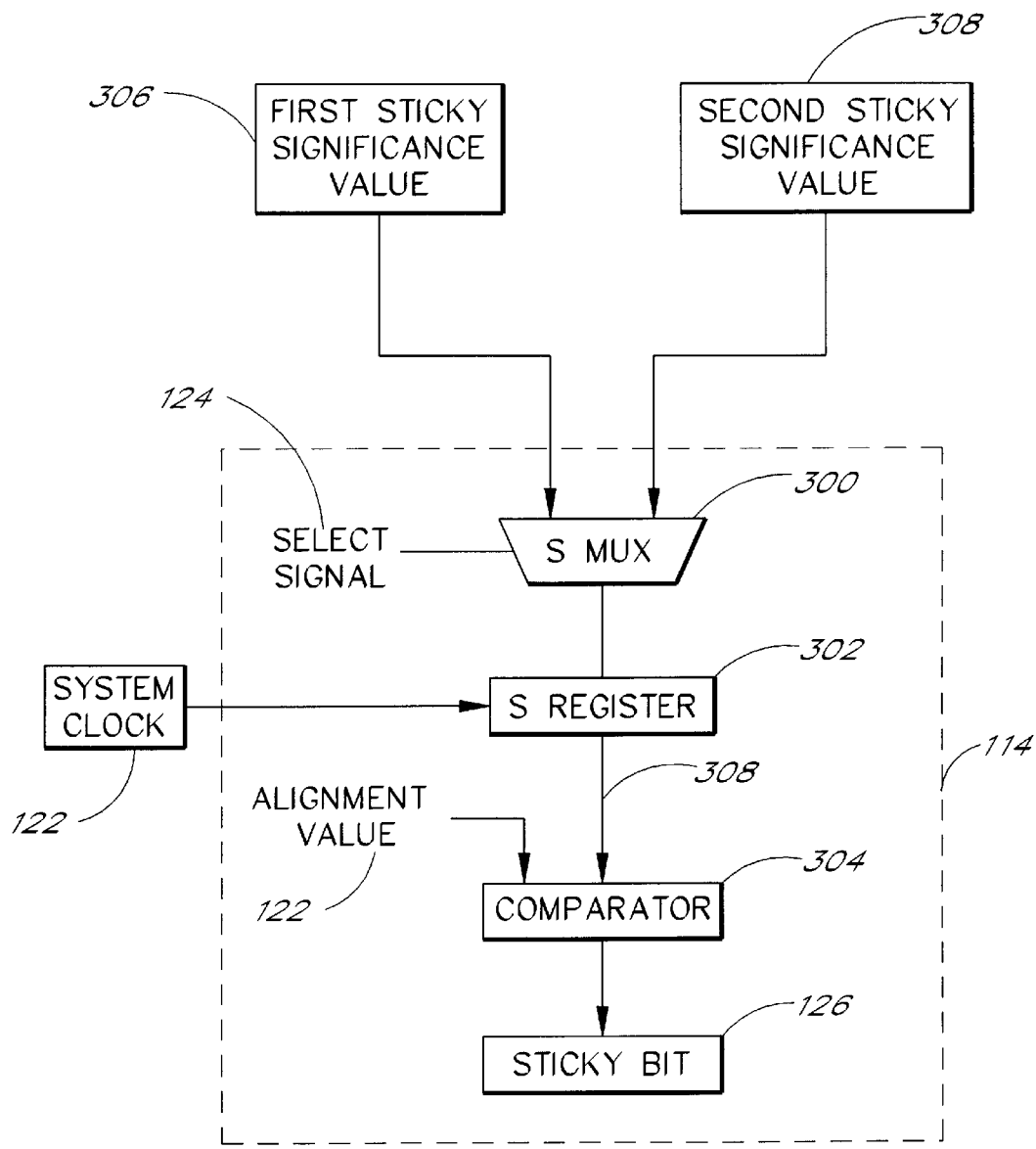
FIG. 3 is a block diagram of the sticky bit predictor circuit showing a first sticky significance value input, a second sticky significance value input, a multiplexer, a register, a comparator and a sticky bit output.

The sticky bit predictor circuit 114 illustrated in FIGS. 1, 3 and 4 uses the alignment value 122 and the select signal 124 to determine the value of the sticky bit 126. Referring to FIG. 3, the sticky bit predictor circuit 114 comprises the SMUX 300, a register called the "S register" 302, a comparator 304 and the sticky bit 126.

An advantage of the present invention is that by precomputing the sticky significance value for each of the internal operands 200, the present invention can determine the sticky bit 126 in parallel with the mantissa arithmetic circuit 112. As illustrated by the block diagrams in FIGS. 1, 3, and 4, it can be seen that the SMUX 300 receives the sticky significance values that correspond to two operands. In particular, the SMUX 300 selects either the first sticky significance value 306 from the memory unit 108 or the second sticky significance value 308 from the bit scanner 116 in response to the select signal 124.

Referring to FIGS. 3 and 4, the select signal 124 is generated by the exponent arithmetic logic unit 434. During an addition of two operands, the floating-point processor 100 aligns the two operands. During the alignment process, the mantissa of the smaller operand is right-shifted until the exponents of both operands equal each other.

In the preferred embodiment, the select signal 124 identifies the sticky significance value corresponding to the smaller exponent. Thus, in response to the select signal 124, the SMUX 300 selects the sticky significance value corresponding to the smaller exponent. The SMUX 300 then transmits this sticky significance value to the S register 302.

The alignment value 122 is determined by subtracting the exponent of two operands in the exponent arithmetic circuit 110. Basically, the alignment value 122 indicates the number of bits that the mantissa arithmetic circuit 112 right-shifts a smaller operand mantissa. For example, if the two operands have identical exponents, the alignment value equals zero. If, however, one operand has a smaller exponent, the alignment value 122 equals the number of right-shifts required to align the smaller operand with the larger operand.

The comparator 304 compares the alignment value 122 with the sticky significance value stored in the S register 302 to determine the sticky bit 126. In the preferred embodiment, if the alignment value 122 is greater than or equal to the selected sticky significance value, the comparator 304 sets the sticky bit 126.

In the following example, two extended precision operands have been converted into two internal operands and are represented as:

| Exponent | Mantissa (As illustrated in FIG. 2B, the least four significant bits of the internal mantissa are the guard, round and sticky bits) | Alignment Value | Sticky Significance Value |
| --- | --- | --- | --- |
| 0001001 | 0101 . . . 000000100000000 | 0 | 9 |
| 0000001 | 0101 . . . 100000000010000 | 8 | 5 |

Figure 7:
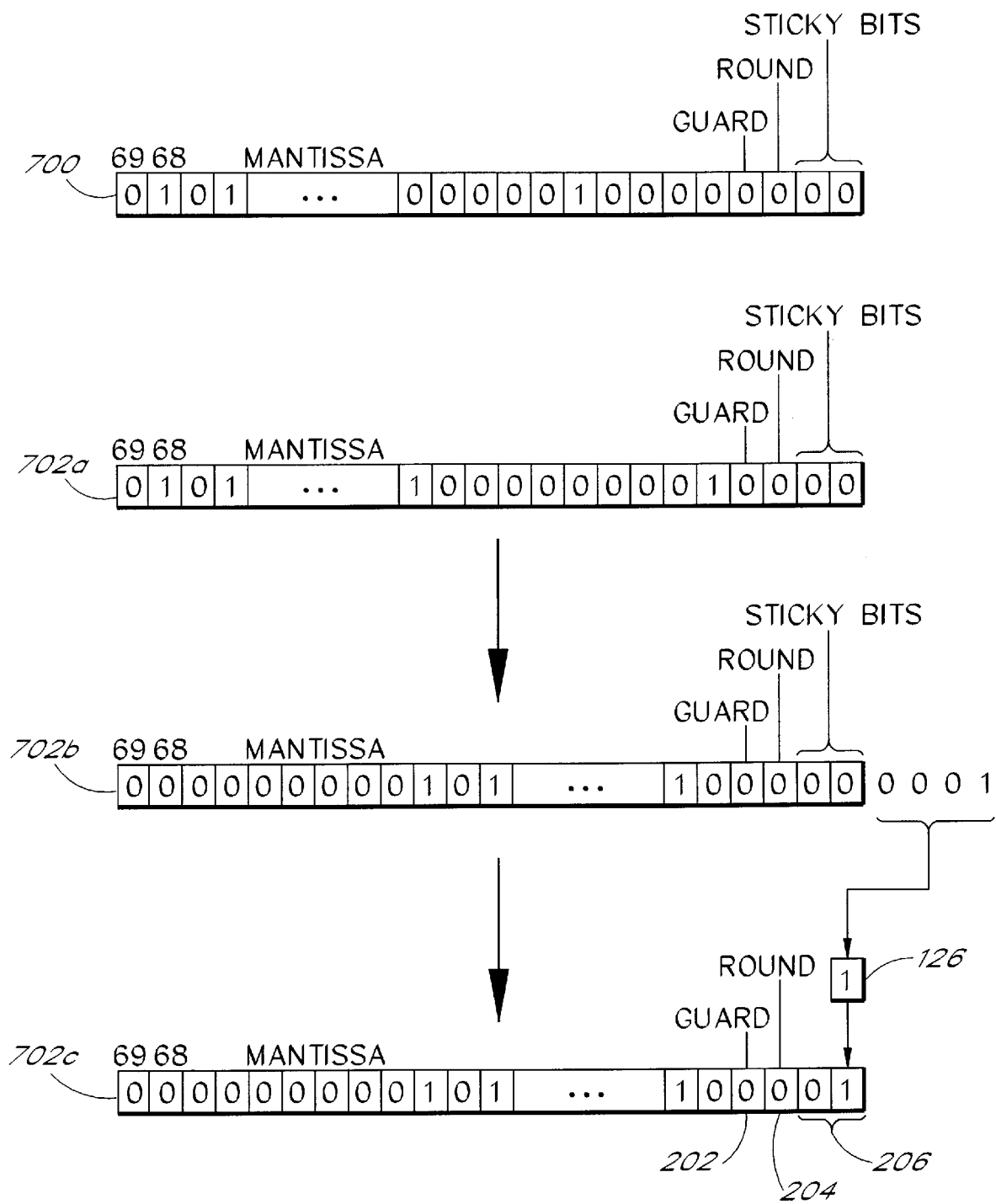
FIG. 7 is a pictorial representation that depicts the addition of two internal operands.

The alignment value 122 is the number of right-shifts necessary to align the two exponents (0001001 and 0000001) which in this case is 8. As shown in FIG. 7, the larger internal operand 700 and the smaller internal operand 702a are first aligned by right shifting the smaller operand 702a. During the right-shift alignment process, the mantissa of the smaller operand will be right-shifted eight times to become the right-shifted internal operand 702b. Consequently, during the right-shift alignment process, the right-shifted operand 702b will lose non-zero bits from its mantissa.

The comparator 304 of the sticky predictor circuit 114 compares the sticky significance value of the smaller operand (which is 5) to the alignment value 122 (which is 8) and sets the sticky bit 126 because the alignment value is greater than the sticky significance value. The sticky bit 126 is then loaded into the least significant sticky bit 206 of the right shifted internal operand 702c.

4. The Memory Unit

The memory unit 108 as illustrated in FIGS. 1 and 4 includes a register buffer 400, an exponent register file 402, a mantissa register file 404 and a sticky significance register file 406. The register buffer 400 latches the sign bit, the exponent, the mantissa and a sticky significance value for the internal operand 200, the single precision operand 208, the double precision operand 210 and the extended precision operand 212 in response to the system clock 120.

The register buffer 400 outputs the latched operand to the exponent register file 402, the mantissa register file 404 and the sticky significance register file 406. In the preferred embodiment, the exponent register file 402, the mantissa register file 404 and the sticky significance register file 406 can store a plurality of internal operands 200, a plurality of single precision operands 208, a plurality of the double precision operands 210 and a plurality of the extended precision operands 212 in response to the system clock 120.

The exponent register file 402 has an exponent write port 408 and two read ports referred to as an "A port" 410 and a "B port" 412. The exponent write port 408 receives the exponent latched into the register buffer 400 and stores the exponent in the location referenced by the write pointer 414. An A port pointer 416 references the exponent output on the A port 410 while a B port pointer 418 references the exponent output on the B port 412. The A port 410 is in turn, coupled to a multiplexer called an AMUX 420 while the B port 412 is coupled to a multiplexer called a BMUX 422. As discussed in more detail below, the floating-point processor 100, generates the write pointer 414, the A port pointer 416, and the B port pointer 418 in response to an operation instructions such as LOAD, ADD, etc.

The write pointer 414, the A port pointer 416 and the B port pointer 418 allow the exponent register file 402 to simultaneously store an exponent while outputting two different exponents on the A port 410 and the B port 412. If the A port pointer 416 or the B port pointer 418 equal the write pointer 414, the exponent is both stored in the exponent register file 402 and output on the proper port.

In contrast, the mantissa register file 404 has a mantissa write port 424 and a read port referred to as a CD port 426. The mantissa write port 424 stores a mantissa in the location referenced by the write pointer 414. A CD port pointer 428 references the mantissa output on the CD port 426. The CD port 426 is coupled to two multiplexers called a CMUX 430 and a DMUX 432.

Thus, the mantissa register file 404 can simultaneously store a mantissa from the register buffer 400 while outputting a mantissa on the CD port 426. If the write pointer 412 equals the CD port pointer 428, the mantissa is both stored in the mantissa register file 404 and output on the CD port 426. The floating-point processor 100 generates the CD port pointer 428 in response to the current instruction cycle.

Turning to the sticky significance register file 406, the sticky significance register file 406 has a sticky significance write port 434 and a read port called an "S port" 436. The sticky significance write port 434 stores a sticky significance value in the location referenced by the write pointer 414. An S port pointer 438 references the sticky significance value output on the S port 436. The S port 436 is coupled to a multiplexer called an SMUX 300.

The sticky significance register file 406 can simultaneously store a sticky significance value in the sticky significance register file 406 while outputting a sticky significance on the S port 436. If the write pointer 414 equals the S port pointer 438, the sticky significance value is both stored in the sticky significance register file 406 and output on the S port 436. The floating-point processor 100 generates the S port pointer 438 in response to the current instruction cycle.

5. The Exponent Arithmetic Circuit

Turning now to the exponent arithmetic circuit 110 as illustrated in FIGS. 1 and 4, the exponent arithmetic circuit 110 consists of the AMUX 420, the BMUX 422, two registers referred to as an "A register" 440, a "B register" 442, a multiplexer called a BBMUX 444, an exponent arithmetic logic unit 446, a multiplexer called an EMUX 448 and an "E register" 450. The AMUX 420 is a four-to-one multiplexer that selects one of four exponents from the A register 440, the input/output bus 128, the A port 410, and the exponent arithmetic logic unit 446. The floating-point processor 100 generates the AMUX 420 control signals (not shown) in response to the current instruction cycle.

The A register 440 latches the exponent selected by the AMUX 420 in response to the system clock 120. The output of the A register 440 is coupled to the exponent arithmetic logic unit 446, the input/output bus 128, and the AMUX 420. Thus, the preferred embodiment of the present invention can simultaneously direct the output of the A register 440 into the exponent arithmetic logic unit 446, to the input/output bus 128, or back into the A register 440 via the AMUX 420.

The BMUX 422 is a two-to-one multiplexer that selects one of two exponents from the B port 412 and the exponent arithmetic logic unit 446. The B register 442 latches the output of the BMUX 422 in response to the system clock 120. The BBMUX 444, on the other hand, is a two-to-one multiplexer that selects an exponent from the B register 442 or an exponent from the input/output bus 128.

The exponent arithmetic logic unit 446 provides basic two's-complement arithmetic operations such as add, subtract, increment, decrement and pass functions. Thus, the exponent arithmetic logic unit 446 can perform operations on the exponent received from the A register 440 and the exponent received from the BBMUX 444. Alternatively, the exponent arithmetic logic unit 446 can simply pass one of the exponents through the exponent arithmetic logic unit 446. The floating-point processor 100 generates the control signals that govern the exponent arithmetic logic unit 446, the BMUX 422 and the BBMUX 444 in response to the current instruction cycle.

The EMUX 448 is a two-to-one multiplexer which selects either the alignment value 122 from the exponent arithmetic logic unit 446 or the normalization value from the normalization bus 130. Therefore, in the preferred embodiment, the E register 450 stores both the alignment value and the normalization value at different times.

When the E register 450 contains the alignment value, the E register 450 communicates the alignment value 122 to the comparator 304 in the sticky bit predictor circuit 114. When the E register 450 contains the normalization value, the E register 450 communicates the normalization value to the bit shifter 452 in the mantissa arithmetic circuit 112.

While the E register 450 stores both the alignment value and the normalization value in the preferred embodiment, other embodiments may store the alignment value separately from the normalization value by storing the alignment value in the exponent arithmetic logic unit 446, or in another register.

6. The Mantissa Arithmetic Circuit

Turning now to the mantissa arithmetic circuit 112 illustrated in FIGS. 1 and 4, the mantissa arithmetic circuit 112 comprises the CMUX 430, the DMUX 432, a "C register" 454, a "D register" 456, the bit shifter 452, a multiplexer called a DBMUX 458, the guard bit 202, the round bit 204, a rounder 460, and a mantissa arithmetic logic unit 462.

The CMUX 430 and the DMUX 432 are two-to-one multiplexers that select either a mantissa from the CD port 426 or a mantissa from the mantissa arithmetic logic unit 462 in response to the select signal 124. The CMUX 430 selects the mantissa with the smaller exponent, while the DMUX 432 selects the mantissa with the larger exponent.

The C register 454 stores the mantissa corresponding to the smaller exponent while the D register 456 stores the other mantissa. The C register 454 communicates the stored mantissa to the bit shifter 452 and to the input/output bus 128. The bit shifter 452 uses the normalization value received from the E register 450 to left-shift the mantissa received from the C register 454 during the normalization process. As the mantissa is shifted left, the most significant non-zero bit in the mantissa is shifted to the left-most bit.

Alternatively, the bit shifter 452 uses the alignment value 122 from the E register 450 to right-shift the mantissa during the alignment process. During the right-shifting, the sticky bit 126 from the sticky bit predictor circuit 114 is added to the least significant bit of the aligned mantissa. Since the sticky bit predictor circuit 114 calculates the stick bit 126 in parallel with the alignment process, the resultant floating-point additions can execute faster and make greater use of parallel architectures.

The mantissa arithmetic logic unit 462 receives the right-shifted mantissa from the bit shifter 452 and the mantissa from the D register 456 via the DBMUX 458. The mantissa arithmetic logic unit 462 provides basic two's-complement arithmetic operations such as add, subtract, increment, decrement and pass functions. The output of the mantissa arithmetic circuit 112 is coupled to the bit scanner 116, the CMUX 430, the DMUX 438, the register buffer 400 and the rounder 460.

6. Rounding An Internal Operand

The rounder 460 indicates whether the mantissa arithmetic logic unit 462 should truncate, increment or decrement the mantissa based on a rounding mode 464, the guard bit 202, the round bit 204 and the plurality of sticky bits 206. If the result of the arithmetic operation is stored as a single, double or extended precision operand, the mantissa arithmetic circuit 112 directs the rounder 460 to analyze the guard bit 202, the round bit 204 and the plurality of sticky bits 206 that exist in each internal mantissa. The circuitry used in the rounder 464 is conventional and is well understood by one of ordinary skill in the art. The rounder 464 generates a round output signal 466 which controls the rounding operations described below.

If the rounder 460 determines that a rounding operation is required the rounder 464 generates the round output signal 466. In response, the mantissa arithmetic circuit 112 then directs the internal operand from the mantissa arithmetic unit 462 to the CMUX 430. The internal operand then passes through the CMUX 430, the C register 454 and back into the mantissa arithmetic unit 462. In addition, the floating-point processor loads a rounding "literal" into the D register. The rounding literal contains a set bit in the least significant bit position depending on whether the mantissa arithmetic circuit needs to store the rounded output operand as a single precision operand 208, a double precision operand 210 or an extended precision operand 212.

Figure 5A:
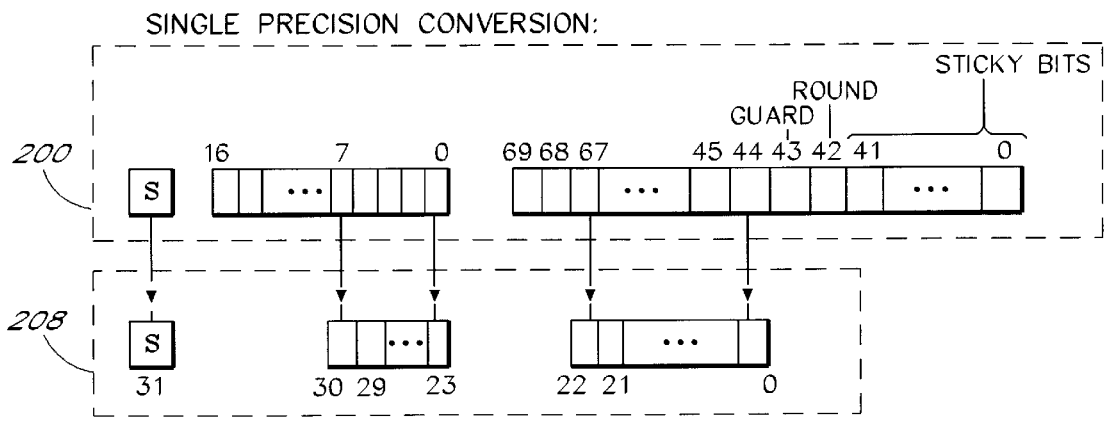
FIGS. 5A–5C are pictorial representations which illustrate the conversion of an internal operand to single precision operand (FIG. 5A), the conversion of an internal operand to a double precision operand (FIG. 5B) and the conversion of an internal operand to an extended precision operand (FIG. 5C).
Figure 5B:
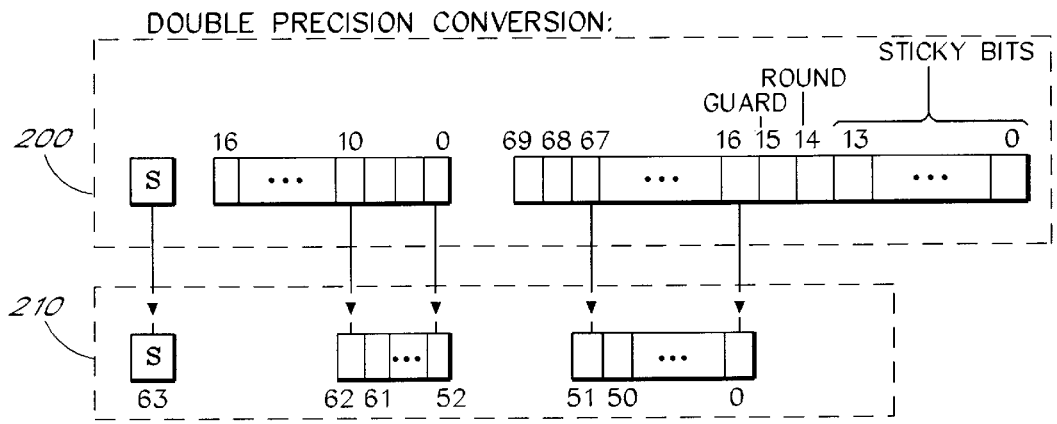
Figure 5C:
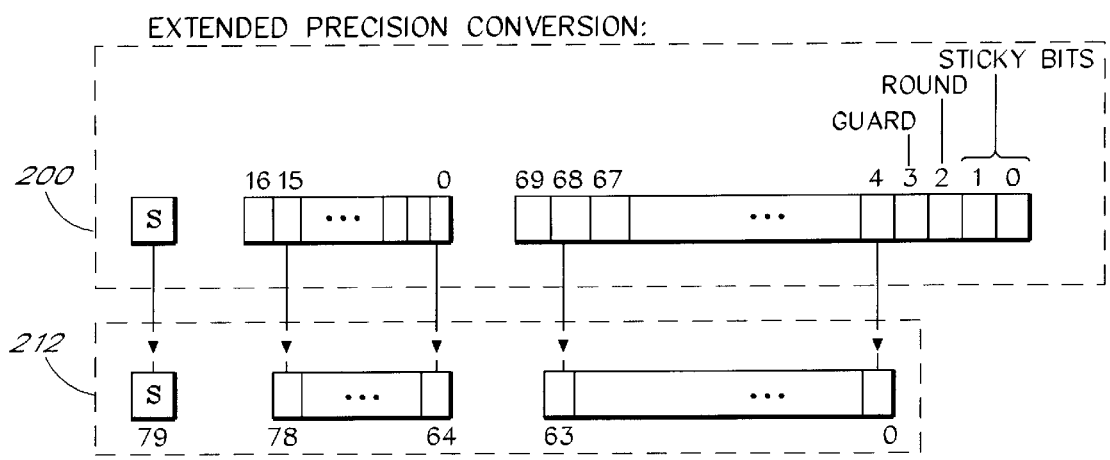

As shown in FIGS. 5A–5C, the input operand exists in the mantissa arithmetic unit 462 as an internal format operand, thus the mantissa must use different rounding schemes to produce a rounded single precision operand 208, a rounded double precision operand 210 and a rounded extended precision operand 212. To produce a rounded single precision operand 208, the mantissa arithmetic unit 462, in the preferred embodiment, rounds the internal operand by adding rounding literal containing a one in bit 45. As discussed above, bit 45 in the internal operand format corresponds to the least significant bit in the single precision mantissa.

To produce a rounded double precision operand 210, the mantissa arithmetic unit 462, rounds the internal operand by adding a rounding literal containing a one in bit 16. Bit 16 in the internal operand format corresponds to the least significant bit in the double precision mantissa. To produce a rounded extended precision operand 212, the mantissa arithmetic unit 462, rounds the internal operand by adding a rounding literal containing a one in bit 4. Bit 4 in the internal operand format corresponds to the least significant bit in the double precision mantissa. Finally, if there is a carry out from the mantissa while rounding, the carry out directs the exponent arithmetic logic unit 446 to increment the exponent by one.

After rounding the mantissa, the floating point processor 100 must also convert the internal exponent into the proper format before storage in the single precision, double precision or extended precision registers as shown in FIGS. 5A–5C. Referring now to FIG. 5A, the exponent arithmetic unit 446 converts the 17-bit internal exponent to an 8-bit single precision exponent by retaining the 8 least significant bits of the internal exponent. If any bits are set in the 9 most significant bits, the number is too large to store as a single precision number, and the exponent arithmetic unit 446 sets an overflow bit.

As shown in FIG. 5B, the exponent arithmetic unit 446 converts the 17-bit internal exponent to the 11-bit double precision exponent by retaining the 11 least significant bits of the internal exponent. If any bits are set in the 6 most significant bits, the number is too large to store as a double precision number, and the exponent arithmetic unit 446 sets an overflow bit. In addition, as shown in FIG. 5C the exponent arithmetic unit 446 converts the internal exponent to the 16-bit extended precision exponent by transferring the 16 least significant bits of the internal exponent to the double precision exponent. If any bits are set in the most significant bit, the number is too large to store as an extended precision number, and the exponent arithmetic unit 446 sets an overflow bit.

7. Adding Two Operands In The Floating-Point Processor

In accordance with the method of the invention, the floating-point processor 100 uses the sticky bit predictor circuit 114 to generate the sticky bit 126 during the addition of two operands. The rounder 460 then rounds an operand based on the sticky bit 126 along with the guard bit 202, the round bit 204 and the rounding mode 464. FIG. 6 shows a cycle decode table of three exemplarary instructions—a LOAD R1 command 600, a LOAD R2 command 602 and an ADD R1,R2 command 604.

To add two numbers, the floating-point processor 100 executes the LOAD R1 command 600, the LOAD R2 command 602, and the ADD R1,R2 command 604. The floating-point processor 100 converts each of the operands (R1 and R2) into internal operands with three parallel processes. If normalization is necessary, the three parallel processes (1) normalize the mantissa, (2) normalize the exponent and (3) compute the sticky significance value for each internal operand 200. The following description will describe each of the three parallel processes.

8.1 Loading the First Operand

In response to the LOAD R1 command 600, the floating point processor 100 converts the first operand (R1) into a first internal operand. After conversion, the floating-point processor 100 checks the first internal operand to determine whether normalization is necessary. In addition, the floating-point processor 100 computes a sticky significance value.

Turning to the mantissa arithmetic circuit 112 as illustrated in FIG. 4, during a first system clock cycle the mantissa of the first internal operand passes through the DBMUX 458 into the mantissa arithmetic logic unit 462. At this stage, the mantissa arithmetic logic unit 462 simply passes the mantissa onto the bit scanner 116.

If the first internal operand isn't normalized, the bit scanner 116 scans the mantissa of the first internal operand for leading zeros to determine the normalization value. The bit scanner 116 communicates the normalization value to the EMUX 448 via the normalization bus 132. In other words, the normalization value identifies the number of left-shifts required to normalize the mantissa. The normalization value generated by the bit scanner 116 passes through the EMUX 448 for storage in the E register 450. The normalization value is loaded into the E register 450 at the end of the first clock cycle.

While the bit scanner 116 scans the mantissa, the mantissa is also directed through the CMUX 430 for storage in the C register 454. The C register 454 loads the mantissa at the end of the first clock cycle.

During the second cycle, if the first internal operand isn't normalized, the bit shifter 452 normalizes the mantissa stored in the C register. The bit shifter 452 uses the normalization value stored in the E register 450 to left-shift the mantissa the specified number of bits. After normalization, the mantissa passes through the mantissa arithmetic logic unit 462 for storage in the register buffer 400. The register buffer 400 loads the normalized mantissa at the end of the second clock cycle. If the first operand did not need normalization, the mantissa isn't shifted in the bit shifter 452.

Turning now to the generation of the sticky significance value for the first internal operand, during the first clock cycle, the bit scanner 116 is used to compute the normalization value of the first internal operand. During the second clock cycle the bit scanner 116 scans the normalized mantissa to generate the sticky significance value. As explained above, the sticky significance value identifies the number of trailing zeros in the normalized mantissa by locating the non-zero least significant bit. The number of trailing zeros indicate the number of times a mantissa can be right-shifted before it shifts a non-zero bit into the sticky bit.

The bit scanner 116 communicates the sticky significance value to the register buffer 400. The register buffer 400 then loads the sticky significance value at the end of the second clock cycle.

Turning now to the normalization of the exponent for the first internal operand, during the first clock cycle, if normalization is necessary, the exponent of the first internal operand 200 is directed through the BBMUX 444 into the exponent arithmetic logic unit 446.

During the second system clock cycle, the exponent arithmetic logic unit 446 increments the exponent as specified by the normalization value. The normalized exponent is then stored in the register buffer 400 at the end of the second cycle. If the first operand doesn't require normalization, the exponent is not incremented.

During the third system clock cycle, the normalized exponent, the normalized mantissa and the sticky significance value of the first internal exponent stored in the register buffer 400 are loaded into the exponent register file 402, the mantissa register file 404 and the sticky significance register file 406. The write pointer 414 identifies the specific location in the exponent register file 402 where the normalized exponent, the normalized mantissa, and the sticky significance value are stored.

8.2 Loading the Second Operand

In response to the LOAD R2 command 602, the floating-point processor 104 converts the second operand from the host system 102 into a second internal operand during the third clock cycle. After conversion, the floating-point processor 100 determines whether to normalize the second internal operand. Therefore, the floating-point processor 100 begins normalizing the second internal operand while the first internal operand is being stored in the exponent register file 402, the mantissa register file 404, and the sticky significance register file 406.

With respect to the mantissa arithmetic circuit 112 as illustrated in FIG. 4, during the third clock cycle, the mantissa of the second internal operand passes through the DBMUX 458 into the mantissa arithmetic logic unit 462. At this stage, the mantissa arithmetic logic unit 462 simply passes the mantissa onto the bit scanner 116.

If the floating-point processor 104 must normalize the second internal operand, the bit scanner 116 scans the mantissa of the second internal operand for leading zeros. The bit scanner 116 locates the left-most significant bit of the mantissa and outputs this location as the normalization value. The normalization value generated by the bit scanner 116 passes through the EMUX 448 for storage in the E register 450. The normalization value is loaded into the E register 450 at the end of the third clock cycle.

While the bit scanner 116 scans the mantissa, the mantissa is also directed through the CMUX 430 for storage in the C register 454. The C register 454 loads the mantissa at the end of the third clock cycle.

During the fourth cycle, the bit shifter 452 normalizes the mantissa stored in the C register in accordance with the normalization value stored in the E register 450. After normalization, the mantissa passes through the mantissa arithmetic logic unit 462 for storage in the register buffer 400. The register buffer 400 loads the normalized mantissa at the end of the fourth cycle. As will be discussed in more detail below, the floating-point processor 100 also directs the normalized mantissa to the CMUX 430 and the DMUX 432.

In order to generate the sticky significance value for the second internal operand, the bit scanner 116 scans the normalized mantissa during the fourth clock cycle to generate the sticky significance value. In addition to loading the sticky significance value in the register buffer 400, as will be discussed in more detail below, the sticky significance value is also directed to the CMUX 430 and the DMUX 432.

In order to normalize the exponent for the second internal operand, during the third clock cycle, if normalization is necessary, the exponent of the second internal operand is directed through the BBMUX 444 into the exponent arithmetic logic unit 446. During the fourth clock cycle, the exponent arithmetic logic unit 446 increments the exponent as specified by the normalization value and stores the normalized exponent into the register buffer 400. In addition to storing the normalized exponent in the register buffer 400, the exponent is directed to the AMUX 420 and the BMUX 422.

During the fifth clock cycle, the normalized exponent, the normalized mantissa and the sticky significance value of the second internal operand are transferred from the register buffer 400 to the exponent register file 402, the mantissa register file 404 and the sticky significance register file 406. The write pointer 414 identifies the specific location in the exponent register file 402 where the normalized exponent, the normalized mantissa, and the sticky significance value are stored.

8.3 Adding Two Operands

The floating-point processor 100 adds two operands in response to the ADD R1,R2 command 604. The process for adding two operands is also executed in parallel. Expanding on the above example, the floating-point processor 100 begins adding the two numbers during the normalization of the second internal operand.

In the preferred embodiment, the alignment of the exponents in the exponent arithmetic circuit 110, the addition of the two mantissas in the mantissa arithmetic circuit 112, and the generation of the sticky bit 126 in the sticky bit predictor circuit 114 execute in parallel. Using a bypass feature, the preferred embodiment can also begin the addition process prior to storing the normalized second internal operand in the register buffer 400.

With respect to the alignment of the second internal operand, the floating-point processor 100 retrieves the exponent of the first internal operand from the A port 410 and directs the exponent through the AMUX 420 to the A register 440 during the fourth clock cycle. As described above, the exponent of the second internal operand is also output by the exponent arithmetic logic unit 446 during the fourth cycle. Thus at the end of the fourth clock cycle, the exponent is loaded into the register buffer 400.

The register buffer 400 may be bypassed by directing the exponent of the internal operand through the BMUX 422 to the B register 442. Thus, the exponent arithmetic circuit 110 can load the second exponent into the B register 442 at the same time the second exponent is loaded into the register buffer 400. By loading the second exponent in two places simultaneously, the floating-point processor 100 can effectively bypass the exponent register file 402.

The floating-point processor 100 directs the exponent of the second internal operand through the BMUX 422 to the B register 442. The exponent is then latched into the B register 442 at the end of the fourth cycle. Therefore, at the end of the fourth cycle, the exponent of the first operand is stored in the A register 440 and the exponent of the second operand is stored in the B register 442.

During the fifth cycle, the exponent arithmetic logic unit 446 aligns the two exponents. The exponent stored in the A register 440 is subtracted from the exponent stored in the B register 442 (the exponent in the A register 440 is fed directly into the exponent arithmetic logic unit 446 while the exponent in the B register 442 passes through the BBMUX 444 to the exponent arithmetic logic unit 446). The result of the exponent subtraction is then communicated to the bit shifter 452 (for aligning the mantissa).

The resulting sign of the exponent subtraction indicates which exponent was larger. If the sign bit is negative, the exponent in the A register 440 is smaller than the exponent in the B register 442. If the sign bit is positive, either the two exponents are equal or the exponent in the A register 440 is smaller. The exponent arithmetic logic unit 446 uses the sign bit to generate the select signal 124. If the sign bit is negative, the select signal 124 is not asserted. If the sign bit is positive, the select signal 124 is asserted.

During the sixth cycle, the exponent arithmetic logic unit 446 completes the exponent alignment process by outputting the aligned exponent. The new exponent of the addition process is then normalized according to the normalization process described above. Once normalized, the new exponent can be output via the input/output bus 128, saved in the exponent register file 402, or redirected to the B register 442 via the BMUX 422.

With respect to the addition of the two mantissas for the first and second internal operands, during the fourth cycle, the floating-point processor 100 retrieves the exponent of the first internal operand from the CD port 426 to the CMUX 430 and the DMUX 432. As described above, the mantissa of the second internal operand is output by the exponent arithmetic logic unit 446 during the fourth cycle. At the end of the fourth clock cycle, the mantissa is loaded into the register buffer 400.

The register buffer 400 may be bypassed by directing the mantissa of the second internal operand to the CMUX 430 and the DMUX 432. Thus, the mantissa arithmetic circuit 112 can load the second mantissa into the B register 442 at the same time the second mantissa is directed to the CMUX 430 and the DMUX 432. By directing the second mantissa exponent to multiple places simultaneously, the floating-point processor 100 can effectively bypass the exponent register file 402.

During the fifth cycle, the select signal 124 generated by the exponent arithmetic logic unit 446 directs the CMUX 430 to select the mantissa of the smaller operand. In contrast, the select signal 124 directs the DMUX 432 to select the mantissa of the larger operand. Thus, the mantissa arithmetic circuit 112 loads the mantissa of the smaller operand into the C register 454 while the mantissa arithmetic circuit 112 loads the mantissa of the larger operand into the D register 456.

During the sixth cycle, the bit shifter 452 aligns the mantissa in the C register 454 and the mantissa arithmetic logic unit 462 adds the two mantissas together. During the addition process, the sticky bit predictor circuit 114 determines a sticky bit 126. The sticky bit 126 replaces the least significant bit in the right-shifted mantissa. As a result, the sticky bit 126 indicates whether the bit shifter 452 has shifted significant data out of the internal mantissa. The mantissa arithmetic logic unit 462 then adds the two mantissas together.

During the sixth cycle, the rounder 460 analyzes the new mantissa output by the mantissa arithmetic logic unit 462. If rounding is necessary, the new mantissa is passed back through the mantissa arithmetic logic unit 462 where the new mantissa is rounded prior to storage in a single precision, double precision, or extended precision register in the mantissa register file 404. The rounded mantissa that results from the addition then passes through the bit scanner 116 to compute a normalization value and a sticky significance value for the new mantissa. Once the mantissa arithmetic circuit 112 normalizes the new mantissa, the new mantissa is stored in the mantissa register file 404 or redirected to the CMUX 430 or the DMUX 432 for the next addition.

With respect to the generation of the sticky bit 126, during the fourth cycle, the floating-point processor 100 retrieves the sticky significance value for the first internal operand from the S port 436. The sticky significance value is then directed to the SMX 300. As described above, the sticky significance value of the second internal operand is also output by the bit scanner 116 during the fourth cycle. At the end of the fourth clock cycle, the sticky significance value is loaded into the register buffer 400.

The register buffer 400 may be bypassed by directing the sticky significance value of the second internal operand to the SMUX 300. Thus, the floating-point processor 100 can load the sticky significance value into the register buffer 400 at the same time the second sticky significance value is directed to the SMUX 300. By directing the second mantissa exponent to two places simultaneously, the floating-point processor 100 can effectively bypass the sticky significance register file 406.

During the fifth cycle, the select signal 124 generated by the exponent arithmetic logic unit 446 directs the S register 302 to select the sticky significance value of the smaller operand. During the sixth cycle, the comparator 304 compares the alignment value generated by the exponent arithmetic logic unit 446 with the sticky significance value stored in the S register 302. If the alignment value is greater than the sticky significance value, the comparator 304 sets the sticky bit 126. Thus, the present invention generates the sticky bit 126 by comparing the sticky significance value with the alignment value. This approach reduces the time needed to determine the sticky bit value during an addition of two mantissas. As a result, the time needed to add two mantissas is reduced.

While the above detailed description has shown, described and pointed out the fundamental novel features of the invention as applied to various embodiments, it will be understood that various omissions and substitutions and changes in the form and details of the illustrated device may be made by those skilled in the art, without departing from the spirit of the invention.

What is claimed is:

1. A floating-point processor comprising:
    a bit scanner that scans the trailing zeros which follow a least significant non-zero bit of at least one mantissa to generate a sticky significance value wherein said sticky significance value identifies the number of right-shifts required to shift said least significant non-zero bit into a sticky bit location;
    a select signal that identifies the smaller exponent of two operands;
    an alignment value that identifies the difference between the exponents of said two operands; and
    a sticky bit prediction circuit connected to said bit scanner, said select signal and said alignment value, wherein said sticky bit prediction circuit receives a first sticky significance value and a second sticky significance value corresponding to said two operands, wherein said sticky bit prediction circuit selects one of said first or second sticky significance values in response to said select signal and compares said selected sticky significance value to said alignment value to generate a sticky bit when said selected sticky significance value is equal to or less than said alignment value.

2. The system defined in claim 1, wherein said floating-point processor further comprises:
    a memory for storing a plurality of mantissas, a plurality of exponents, and a plurality of sticky bit significance values for a plurality of operands; and
    an exponent arithmetic unit connected to said memory, said exponent arithmetic unit receiving a first exponent and a second exponent and subtracting said first exponent from said second exponent to generate said alignment value and said select signal.

3. The system defined in claim 1, wherein said alignment value is the difference between said first exponent and said second exponent.

4. The system defined in claim 1, wherein said select signal identifies which of said first exponent and said second exponent is smaller.

5. The system defined in claim 1, wherein said floating-point processor further comprises a mantissa arithmetic unit connected to said memory, said mantissa arithmetic unit receiving a first mantissa and a second mantissa and adding said first mantissa to said second mantissa to output a third mantissa in parallel with said sticky bit predictor circuit.

6. The system defined in claim 5, wherein said sticky bit prediction circuit and said mantissa arithmetic circuit operate in parallel with said exponent arithmetic circuit.

7. The system defined in claim 5, wherein said sticky bit prediction circuit further comprises:
    a first multiplexer connected to said select signal and to said memory, wherein said first multiplexer selects one of said first sticky significance value and said second sticky significance value in response to said select signal; and
    a comparator coupled to said multiplexer and to said alignment value, said comparator generating a sticky bit in response to said selected sticky significance value and said alignment value.

8. A circuit for predicting a sticky bit value when adding or subtracting two numbers comprising:
    a bit scanner which scans the trailing zeros which follow a least significant non-zero bit of a mantissa to generate a sticky significance value which identifies the number of shifts required to shift said least significant non-zero bit into a bit location which is less significant than a round bit location;
    a memory connected to said bit scanner, said memory storing said mantissa, said sticky significance value and an exponent for at least two operands;
    an exponent arithmetic unit connected to said memory, said exponent arithmetic unit subtracting a first exponent from a second exponent to generate an alignment value and a select signal;
    a first multiplexer connected to said memory and said first comparator, said first multiplexer receiving said select signal, a first sticky significance value and a second sticky significance value, said first multiplexer outputting a selected sticky significance value in response to said select signal; and
    a comparator coupled to said multiplexer and said exponent arithmetic unit, said comparator generating a sticky bit in response to said selected sticky significance value and said alignment value.

9. The circuit as defined in claim 8, wherein said comparator generates a sticky bit when said sticky significance value is equal to or less than said alignment value.

10. The circuit as defined in claim 8, wherein said exponent arithmetic unit subtracts said first exponent from said second exponent with two's complement addition.

11. The circuit as defined in claim 8, further comprising:
    a second multiplexer connected to said memory and said exponent arithmetic unit, said second multiplexer receiving a first mantissa and a second mantissa and outputting the smaller mantissa of said first mantissa and said second mantissa in response to said select signal;
    a shifter connected to said second multiplexer and said exponent arithmetic unit, said shifter right-shifting said smaller mantissa in accordance with said alignment value and outputting an aligned mantissa;
    a third multiplexer connected to said memory and said exponent arithmetic unit, said third multiplexer receiving said first mantissa and said second mantissa and outputting the larger mantissa of said first mantissa and said second mantissa in response to said select value; and
    a mantissa arithmetic unit connected to said shifter and said third multiplexer, said mantissa arithmetic unit outputting a third mantissa which is the sum of said larger mantissa and said aligned mantissa.

12. The circuit as defined in claim 11, wherein said exponent arithmetic unit, said mantissa arithmetic unit and said comparator operate in parallel.

13. The circuit as defined in claim 11, wherein said exponent is 17 bits.

14. The circuit as defined in claim 13, wherein said mantissa is 70 bits.

15. A circuit for predicting a sticky bit value when adding or subtracting two numbers, comprising:
    a data bus;

input logic connected to said data bus, said input logic receiving a single, double or extended precision operand and converting said single, double, or extended precision operand into an internal format in response to receiving said single, double, or extended precision operand;

a floating-point data bus connected to the output of said input logic;

a bit scanner connected to said floating-point data bus, said bit scanner configured to receive a mantissa and scan the leading zeros of said mantissa to generate a normalization value which identifies the location of the most significant non-zero bit in said mantissa, and said bit scanner further configured to scan the trailing zeros to identify a least significant non-zero bit of said mantissa and to generate a sticky significance value which predicts the number of shifts required to shift said least significant non-zero bit into a sticky bit location;

a shifter coupled to said bit scanner and said data bus, said shifter receiving said mantissa and said normalization value and normalizing said mantissa in accordance with said normalization value;

a memory connected to said data bus, said memory receiving and storing said mantissa, said sticky significance value and said exponent for at least two operands;

an exponent arithmetic unit connected to said data bus, said exponent arithmetic unit receiving a first exponent and a second exponent and subtracting said first exponent from said second exponent to generate an alignment value and a select signal;

a first multiplexer connected to said data bus and said exponent arithmetic unit, said first multiplexer receiving a first sticky significance value and a second sticky significance value from said data bus and receiving said select signal from said exponent arithmetic unit, said first multiplexer outputting a selected sticky significance value in response to said select signal; and a comparator coupled to said multiplexer and said exponent arithmetic unit, said comparator receiving said selected sticky significance value and said alignment value and outputting a sticky bit when said alignment value is greater than or equal to said sticky significance value.

16. The circuit as defined in claim 15, wherein said input circuitry converts said single, double, or extended precision operand into a 17-bit exponent and a 70-bit mantissa.

17. The circuit described in claim 15, wherein said exponent arithmetic unit, said comparator and said mantissa arithmetic unit operate in parallel.

18. A circuit for predicting a sticky bit value when adding or subtracting two numbers, comprising:

an input conversion circuit which receives an operand and separates said operand into an exponent and a mantissa;

a bit scanner which receives said mantissa, said bit scanner configured to scan the trailing zeros which follow a least significant non-zero bit in said mantissa to generate a sticky significance value which predicts the number of shifts associated with the generation of a sticky bit;

a memory connected to said bit scanner, said memory storing said mantissa, said sticky significance value and an exponent for at least two operands;

an arithmetic unit connected to said memory, said arithmetic unit receiving a first exponent and a second exponent from said memory and comparing said first exponent with said second exponent to generate an alignment value and a select signal;

a multiplexer coupled to said memory and said arithmetic unit, said multiplexer selecting either a first sticky significance value or a second sticky significance value to output in response to said select signal; and a comparator which compares said selected sticky significance value and said alignment value, said comparator outputting a sticky bit when said alignment value is equal to or greater than said selected sticky significance value.

19. A method of generating a sticky bit comprising the steps of:

providing a plurality of operands, wherein each operand of said plurality of operands has a mantissa and an exponent;

scanning the trailing zeros which follow a least significant non-zero bit of each mantissa in said plurality of operands to generate a plurality of sticky significance values wherein each sticky significance value corresponds to one of said mantissas, and wherein each sticky significance value predicts the number of shifts associated with the generation of a sticky bit;

storing said plurality of operands and said plurality of sticky significance values in a memory;

comparing a first exponent and a second exponent from said memory to generate an alignment value and a select signal;

selecting either a first sticky significance value or a second sticky significance value for output in response to said select signal;

comparing said selected sticky significance value with said alignment value; and generating a sticky bit if it is determined that said sticky significance value is equal to or less than said alignment value.

20. A floating-point processor comprising:

a bit scanner which receives a plurality of operands, wherein each operand of said plurality of operands has a mantissa and an exponent, said bit scanner configured to scan the trailing zeros which follow a least significant non-zero bit in each mantissa in said plurality of operands to generate a plurality of sticky predictor values wherein each of said sticky predictor values corresponds to one of said mantissas and wherein each of said sticky predictor values identifies the number of shifts associated with the generation of a sticky bit; and a memory which is configured to store said plurality of operands and said plurality of sticky predictor values.

21. The floating-point processor of claim 20 further comprising:

an arithmetic unit connected to said memory, said arithmetic unit receiving a first exponent of a first operand and a second exponent of a second operand from said memory and comparing said first exponent with said second exponent to generate an alignment value;

a multiplexer coupled to said memory and said arithmetic unit, said multiplexer selecting either a first sticky predictor value corresponding to said first operand or a second sticky predictor value corresponding to said second operand; and a comparator which compares said selected sticky predictor value and said alignment value, said comparator outputting a sticky bit when said alignment value is equal to or greater than said selected sticky predictor value.

* * * * *